Patented May 30, 1950

2,509,200

UNITED STATES PATENT OFFICE 2,509,200

MONOSODIUM SALT OF GOLD THIOITAMALIC ACID

Edmond E. Moore and Ray J. Ohman, Waukegan, Ill., assignors to Abbott Laboratories, North Chicago, Ill., a corporation of Illinois No Drawing. Application July 31, 1947, Serial No. 765,242

4 Claims. (Cl. 260—430)

This invention relates generally to gold organic compounds and more specifically to gold thioitamalic acid and its salts.

It has been known for some time that gold organic compounds are effective in the treatment of many of the diseases of mankind. It has been the general property of these compounds, however, to be either unstable in aqueous solution so that it is impossible to dispense the compound as an injectable solution due to this instability; or they may be hygroscopic so that the solid compound is subjected to the deleterious effects of atmospheric moisture on storage. As referred to in this application, compounds have been developed which do not have these objectionable properties. Furthermore, those salts which are soluble are stable to the usual means of sterilization both as solutions and as solids. Very few gold organic compounds are stable to sterilization by autoclaving by steam pressure; but these compounds are stable to such sterilization. The compounds of the invention have indicated utility in the treatment of such human ailments as rheumatoid arthritis and *Lupus erythematosus*.

These compounds are easily obtained in the pure state. As a general procedure, an excess of thioitamalic acid is reacted with a gold salt to form the gold thioitamalic acid. From this acid, the desired alkali or organic base salts may be prepared.

The compounds of this application may be indicated by the structure below:

COOX—CH₂—CH(CH₂SAu)—COOX wherein X is a hydrogen or a cation. The preferred cations of the invention are the alkali metals, the alkaline earth metals, amine and alkanolamine radicals.

The following examples will illustrate the specific preparation of these compounds.

EXAMPLE I

*Gold thioitamalic acid*

COOH—CH₂—CH(CH₂SAu)—COOH

An excess of thioitamalic acid, such as three moles for one of the auric chloride used, is dissolved in water. While this solution is being stirred, one mole of aqueous auric chloride is added slowly. After the color of the solution changes from brown to yellow, the solution is filtered and evaporated to a jelly-like paste on a steam bath at reduced pressure. The paste is triturated and washed with hot ethyl acetate. The yellowish crystalline powder thus obtained is air-dried, then redissolved in water. An amount of about 5% of pure activated charcoal is added, then filtered and the carbon residue washed with water. The washings and filtrate are combined and evaporated as before. The residue is triturated at this time with acetone and then dried under vacuum for four hours at 100° C. Based on the gold used, the yield is quantitative. The analysis of the compound prepared is:

|  | Theory, per cent | Found, per cent |
| --- | --- | --- |
| Gold | 54.73 | 55.39 |
| Carbon | 16.67 | 16.89 |
| Hydrogen | 1.96 | 1.99 |

This process has all of the desired simplicity that is possible. It is cheaper than the other processes for making gold organic compounds. It is easier to make since it is not necessary to convert the gold chloride or bromide used here to the gold cyanide used in other processes. It has an advantage over gold iodide used in some processes in that gold iodide is unstable; resulting in lower yields and more difficult purification of the resulting product. In general, then, it may be said that a saving of time, materials and equipment may be accomplished by the use of this process.

Instead of using auric chloride in the above example, aurous chloride or bromide and auric bromide may be used.

EXAMPLE IA

By using the same process as above but substituting potassium auric bromide (KAuBr₄) for auric chloride the gold thioitamalic acid is also obtained.

In addition to preparing the gold thioitamalic acid, various salts of the acid have been prepared both in solution and as solids. The examples below are for the purpose of illustration.

EXAMPLE II

*Monosodium salt of gold thioitamalic acid*

COOH—CH₂—CH(CH₂SAu)—COONa

This compound is prepared by mixing one mole of the gold thioitamalic acid and one mole of sodium hydroxide in a suitable quantity of water. The solution thus prepared is neutral to litmus. This preparation may be sterilized by the conventional methods for the sterilization of solutions. Among these methods is sterilizing by autoclaving at 15 lbs. per sq. in. of steam for 20 minutes. Suitable stable concentrations have been made ranging from less than 1% to 20% of the monosodium salt of the gold thioitamalic acid. The solid may be prepared by evaporation of the solvent or by crystallization from concentrated solution prepared by partial evaporation of the solution, or by precipitation from the solution by adding alcohol. This compound is non-hygroscopic and gives stable aqueous solutions capable of sterilization. In addition to being cheaper than other therapeutic gold compounds available, it possesses improved properties of the type desired in the pharmaceutical art.

EXAMPLE IIA

*Disodium salt of gold thioitamalic acid*

$$COONa—CH_2—CH(CH_2SAu)—COONa$$

The disodium salt of gold thioitamalic acid may be prepared by adding slowly two moles of sodium hydroxide to an aqueous solution of one mole of gold thioitamalic acid. Since, however, aqueous solutions of this disodium salt are somewhat alkaline, they are not as suitable for injectable pharmaceutical preparations as is the monosodium salt. The monosodium salt is nearly neutral in an aqueous solution making this product very suitable for pharmaceutical preparations.

EXAMPLE IIB

*Monosodium salt of gold thioitamalic acid*

$$COOH—CH_2—CH(CH_2SAu)—COONa$$

As an alternative procedure to Example II the monosodium salt may be prepared by adding to an aqueous solution of the gold thioitamalic acid an equal molecular amount of disodium salt of gold thioitamalic acid. This results in the monosodium gold thioitamalic acid which may be isolated as in Example II.

EXAMPLE IIC

*Monosodium salt of gold thioitamalic acid*

$$COOH—CH_2—CH(CH_2SAu)—COONa$$

By starting with the disodium salt of gold thioitamalic acid, the monosodium salt may be prepared by adding an equal molecular amount of an acid such as hydrochloric acid. The solid may be worked up as in Example II.

In addition to the mono- and di-sodium salts, other alkali-metal and alkaline earth metal salts, and various amine and alkanolamine salts may be prepared as above such as those of ammonia, triethanolamine, monoethanolamine, and methylglucamine. In the case of the amine salts, both the mono- and di-amine salts provide stable, aqueous solutions.

Also, the calcium salt may be prepared in a somewhat different manner than above. This procedure is described below:

EXAMPLE III

*Calcium salt of gold thioitamalic acid*

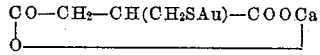

The above compound is prepared by adding an excess of calcium chloride to an aqueous solution of the mono-sodium salt of gold thioitamalic acid. The calcium salt is insoluble in water and therefore precipitates. This precipitate is easily isolated by filtration. The precipitate is washed with water and dried.

EXAMPLE IV

We have discovered that the calcium and sodium salts, when suspended in oil, provide an excellent means of administering this source of gold in an organic compound for the therapeutic treatment by injection. The resulting suspension is stable in any concentration. A large variety of oils are satisfactory. In fact, any oil which is assimilable by the body may be used. The preferred oils for use in our composition are vegetable oils such as: sesame, peanut, olive, rape-seed, and cotton-seed oils. These oil suspensions are stable to sterilization by autoclaving under 15 lbs. per sq. in. of steam for 20 minutes.

The term "mole" as used in the specification is intended to refer to a gram molecular weight quantity.

Others may readily adapt the invention for use under various conditions of service, by employing one or more of the novel features disclosed, or equivalents thereof. As at present advised with respect to the apparent scope of our invention, we desire to claim the following subject matter.

We claim:

1. The compound monosodium salt of gold thioitamalic acid represented by the following formula:

$$COOH—CH_2—CH(CH_2SAu)—COONa$$

and its solutions.

2. The process of preparing aqueous solutions of the monosodium salt of gold thioitamalic acid, which comprises: reacting one mole of sodium hydroxide with an equal molecular quantity of a solution of gold thioitamalic acid.

3. The process of preparing aqueous solutions of the monosodium salt of gold thioitamalic acid, which comprises: reacting equal molecular proportions of gold thioitamalic acid and the disodium salt of gold thioitamalic acid in said aqueous medium.

4. The process of preparing aqueous solutions of the monosodium salt of gold thioitamalic acid, which comprises: reacting equivalent proportions of an aqueous solution of the disodium salt of gold thioitamalic acid and an acid.

EDMOND E. MOORE.
RAY J. OHMAN.

REFERENCES CITED

The following references are of record in the file of this patent:

UNITED STATES PATENTS

| Number | Name | Date |
|---|---|---|
| 1,994,213 | Delepine | Mar. 12, 1935 |
| 2,049,198 | Delange | July 28, 1936 |
| 2,352,124 | Sabin et al. | June 20, 1944 |

OTHER REFERENCES

"Chemical Abstracts," vol. 37 (1943), column 3403, abstract of paper by Schjanberg.